US009256329B1

(12) United States Patent
Shen et al.

(10) Patent No.: US 9,256,329 B1
(45) Date of Patent: Feb. 9, 2016

(54) TOUCH PANEL SENSOR SYSTEM HAVING MULTI-FREQUENCY DRIVE SIGNALS

(71) Applicant: Qualcomm Technologies, Inc., San Diego, CA (US)

(72) Inventors: Guozhong Shen, San Jose, CA (US); Ozan E. Erdogan, San Jose, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 183 days.

(21) Appl. No.: 13/719,656

(22) Filed: Dec. 19, 2012

(51) Int. Cl.
*G06F 3/041* (2006.01)
*G06F 3/044* (2006.01)

(52) U.S. Cl.
CPC .................................... *G06F 3/044* (2013.01)

(58) Field of Classification Search
CPC .......... G06F 3/041; G06F 3/044; G06F 3/045
USPC .................................................. 345/174, 173
See application file for complete search history.

(56) References Cited

U.S. PATENT DOCUMENTS

| | | | | |
|---|---|---|---|---|
| 5,898,304 | A | * | 4/1999 | Mandl ........................... 324/232 |
| 8,493,331 | B2 | * | 7/2013 | Krah et al. ..................... 345/173 |
| 2008/0239265 | A1 | * | 10/2008 | Den Boef ........................ 355/53 |

* cited by examiner

*Primary Examiner* — Fred Tzeng
(74) *Attorney, Agent, or Firm* — Weaver Austin Villeneuve & Sampson, LLP

(57) ABSTRACT

A touch panel sensor system configured to generate simultaneous drive signals having different frequencies to improve noise immunity is described. The touch panel sensor system includes a sensor configured to detect a change in capacitance associated with a touch upon a touch panel. The system also includes a drive component connected to the sensor and is configured to simultaneously generate a plurality of drive signals to simultaneously drive the sensor. Each drive signal has a different frequency characteristic with respect to the other drive signals. The system also includes a measuring component connected to the sensor and is configured to individually demodulate a plurality of signals to determine the change in capacitance. Each signal corresponds to a respective drive signal (e.g., the signal has the same, or approximately the same, frequency characteristic as the respective drive signal).

19 Claims, 5 Drawing Sheets

TOUCH PANEL SENSOR SYSTEM HAVING MULTI-FREQUENCY DRIVE SIGNALS

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

SUMMARY

A touch panel sensor system configured to generate simultaneous drive signals having different frequencies to improve noise immunity is described. The touch panel sensor system includes a sensor configured to detect a change in capacitance associated with a touch upon a touch panel. The system also includes a drive component connected to the sensor and is configured to simultaneously generate a plurality of drive signals to simultaneously drive the sensor. Each drive signal has a different frequency characteristic with respect to the other drive signals. The system also includes a measuring component connected to the sensor and is configured to individually demodulate a plurality of signals to determine the change in capacitance. Each signal corresponds to a respective drive signal (e.g., the signal has the same, or approximately the same, frequency characteristic as the respective drive signal).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Noise, or unwanted signals, in capacitive touch sensing systems generally interfere with the operation of the systems. While capacitive touch sensing systems are designed to only measure signals related to a user's touch, noise signals generated from cold cathode fluorescent lamps (CCFL), AC/DC chargers, liquid crystal displays, and so forth, distort the touch signals so the touch signals cannot be properly measured by the sensors.

Accordingly, a touch panel sensor system configured to generate simultaneous drive signals having different frequencies to improve noise immunity is described. The touch panel sensor system includes a sensor configured to detect a change in capacitance associated with a touch upon a touch panel. The system also includes a drive component connected to the sensor and is configured to simultaneously generate a plurality of drive signals to simultaneously drive the sensor. Each drive signal has a different frequency characteristic with respect to the other drive signals. The system also includes a measuring component connected to the sensor and is configured to individually demodulate a plurality of signals to determine the change in capacitance. Each signal corresponds to a respective drive signal (e.g., the signal has the same, or approximately the same, frequency characteristic as the respective drive signal). For example, the measuring component may include a charge amplifier, a plurality of frequency mixers, and an object extraction component. Thus, if one or more of the signals the measuring component is monitoring (e.g., detecting change in capacitance, etc.) to determine whether a change in capacitance has occurred is corrupted, the measuring component can utilize the uncorrupted signals to determine whether a change in capacitance has occurred. If one of the signals is corrupted (e.g., noisy), the system is configured to generate another drive signal having a frequency characteristic different from the frequency characteristic of the corrupted signal. Based upon the change in capacitance, the measuring component is configured to determine at least a position of the touch performed within the touch panel area.

Example Implementations

Figure 1A:
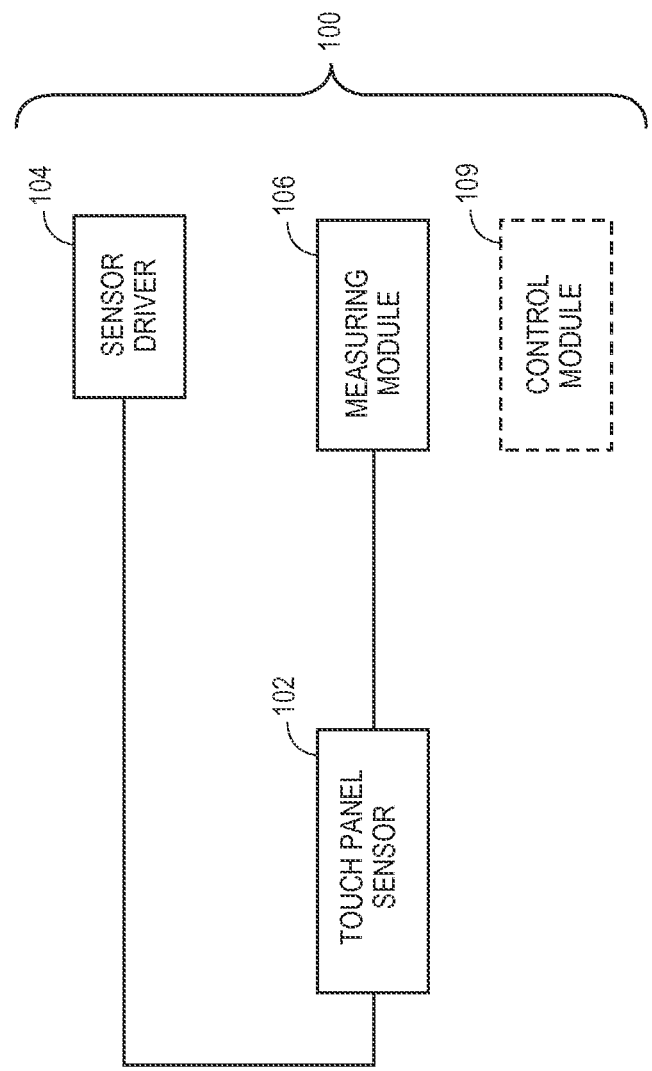
FIG. 1A is a block diagram illustrating a touch panel sensor system in accordance with an example implementation of the present disclosure.

FIG. 1A illustrates a block diagram of a touch panel sensor system 100 in accordance with an example implementation of the present disclosure. The touch panel sensor system 100 can utilize multiple stimulation frequencies and phases to detect touch events performed over a touch sensor panel. The touch panel sensor system 100 may include a touch panel sensor 102, a drive component (e.g., a sensor driver 104), and a touch event measuring component 106. Viewed together, the touch panel sensor 102, the sensor driver 104, and the touch event measuring component 106 comprise a capacitance-to-voltage converter circuit. In implementations, the touch panel sensor system 100 may include a greater number or a lesser number of the above components in accordance with the requirements of the system 100 (e.g., space restraints, functionality requirements, etc.). The touch panel sensor system 100 may also include additional components, such as multiplexers, controllers, and so forth. For example, one or more multiplexers may be coupled to multiple sensors of the touch panel sensor 102 and selectively output sensed capacitance signals from the selected sensors to the measuring component 106.

The sensor driver 104 (e.g., a drive component) is coupled (e.g., electrically connected) to the touch panel sensor 102.

The sensor driver 104 is configured to generate a plurality of drive signals having periodic waveform characteristics (e.g., periodic drive signals) to drive the touch panel sensor 102 simultaneously. In an implementation, each drive signal has a different frequency component with respect to the other drive signal frequency components. For example, the sensor driver 104 is configured to generate a first drive signal having a first frequency, a second drive signal having a second frequency, and a third drive signal having a third frequency. Each drive signal generated by the sensor driver 104 is configured to drive the coupled sensors (e.g., the touch panel sensor 102). Thus, in a specific example, the touch panel sensor 102 is driven by the first drive signal, the second drive signal, and the third drive signal simultaneously. In an implementation, the sensor driver 104 comprises a digital to analog converter (DAC). In another implementation, the sensor driver 104 may be other suitable devices capable of generating analog driving signals having differing frequency characteristics simultaneously.

The touch panel sensor 102 is coupled to the output of the sensor driver 104 and the input of the measuring component 106. As a result, when the sensor driver 104 outputs the drive signals, the charge from the change in capacitance due to the touching of a touch panel surface (which incorporates the touch panel sensor 102) is transferred from the touch panel sensor 102 to the input of the measuring component 106 at node (N1) 110. The measuring component 106 is configured to measure the change in capacitance with respect to the touching of the touch panel surface and to determine a position and/or magnitude of the touch based upon the change in capacitance. For example, the measuring component 106 is configured to measure the capacitance by decoding (e.g., demodulating) the signals individually, which is described in greater detail below with respect to the frequency mixers. In some implementations, the touch panel sensor 102 is a capacitive touch panel having one or more capacitive sensors therein. For example, the touch panel sensor 102 can include a capacitive sensing medium having a plurality of row traces or driving lines and a plurality of column traces or sensing lines. The row and the column traces can be formed from a transparent conductive material, such as Tin Oxide (ITO) or Antimony Tin Oxide (ATO), although other transparent and non-transparent materials such as copper may be used. In some implementations, the row and the column traces can be perpendicular to each other. In other implementations, other non-Cartesian orientations are also possible.

Figure 1B:
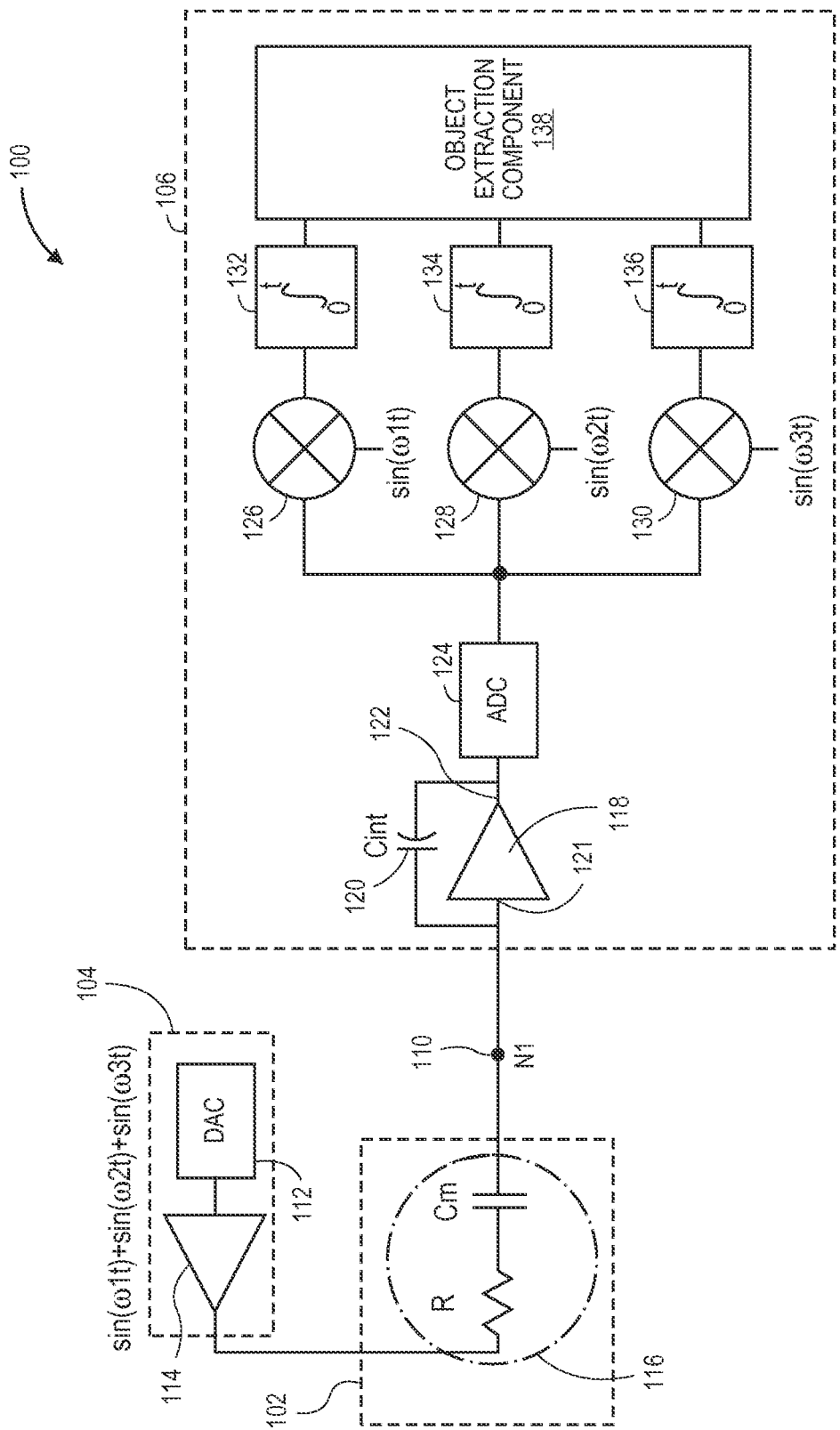
FIG. 1B is a circuit diagram illustrating an example implementation of the touch panel sensor system shown in FIG. 1A, where demodulation of one or more signals occurs in the digital domain.

FIG. 1B illustrates a specific implementation of the touch panel sensor system 100 shown in FIG. 1A. As shown in FIG. 1B, the sensor driver 104 includes a sensor digital-to-analog converter (DAC) 112 coupled to a buffer 114. The buffer 114 buffers the drive signals produced by the sensor DAC 112 and outputs the periodic sensor drive signals to a sensor 116 of the touch panel sensor 102 to drive the sensor 116. The sensor DAC 112 is configured to generate one or more analog signals having waveform characteristics represented by the equation:

$$A1\sin(\omega 1 t + \phi 1) + A2\sin(\omega 2 t + \phi 2) + A3\sin(\omega 3 t + \phi 3), \quad \text{EQN.1}$$

where A1, A2, and A3 represent an amplitude of the respective signal, $\omega 1$, $\omega 2$, and $\omega 3$ represent the respective angular frequency of the respective signal ($\omega 1$, $\omega 2$, and $\omega 3$ each differ in frequency value with respect to each other), $\phi 1$, $\phi 2$, and $\phi 3$ represent the phase of the respective signal and t represents time. It is understood that in some implementations A1, A2, and A3 may have the same amplitude values with respect to each other or may have differing amplitude values with respect to each other. $\phi 1$, $\phi 2$, and $\phi 3$ could be same value or different values. It is understood that in other implementations, the sensor DAC 112 may configured to output other signals having other waveform characteristics, such as signals having square waveform characteristics, and so forth.

Figure 1C:
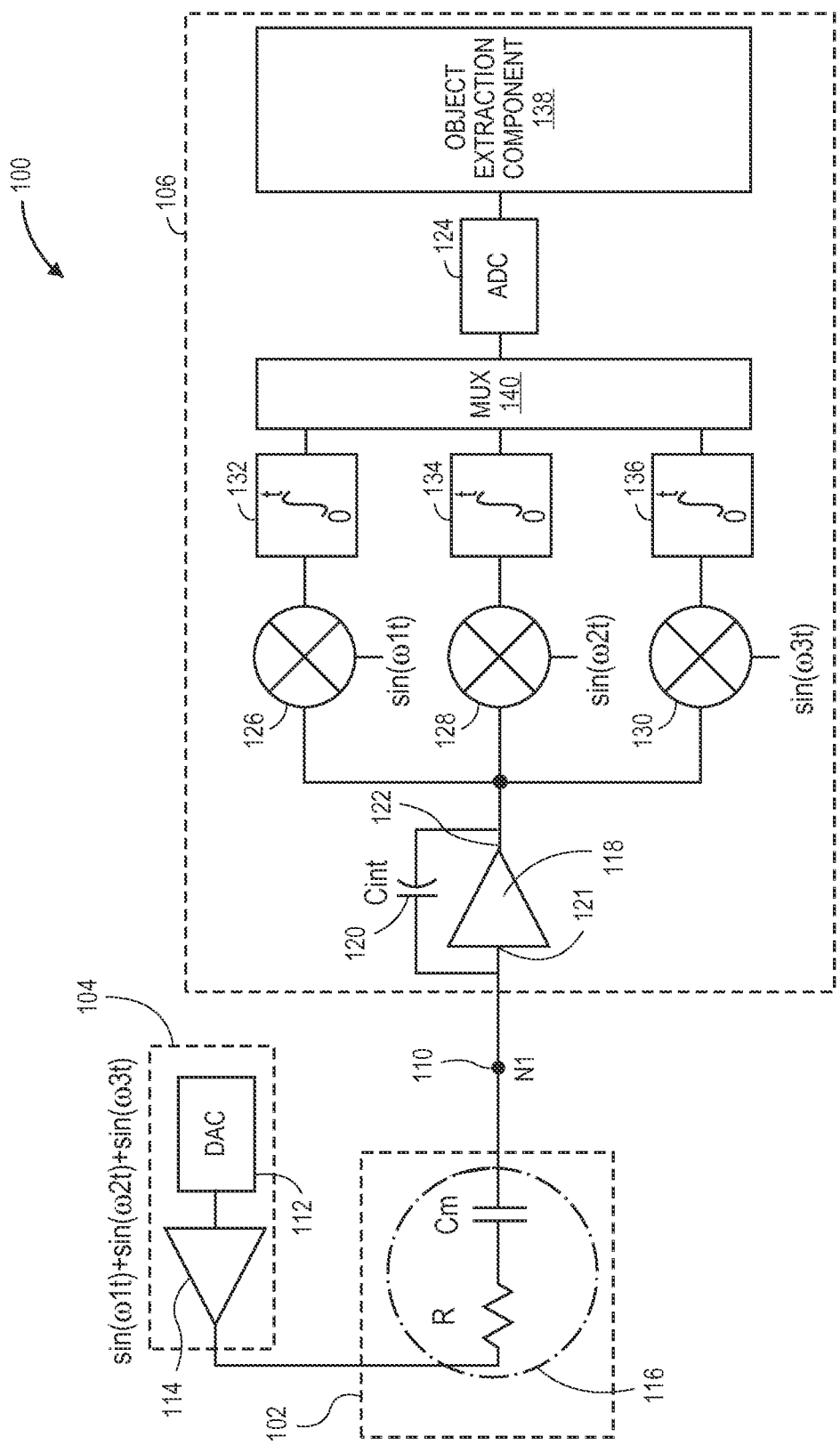
FIG. 1C is a circuit diagram illustrating another example implementation of the touch panel sensor system shown in FIG. 1A, where demodulation of one or more signals occurs in the analog domain.

As shown in FIGS. 1B and 1C, the touch panel sensor 102 comprises the sensor 116, which can be modeled as a resistor (R) serially coupled to a mutual capacitor ($C_m$). While only a single resistor and capacitor is shown, it is understood that the sensor 116 may be modeled as including additional resistors, capacitors, other suitable capacitive sensing circuitry, combinations thereof, and so forth, according to the requirements of the system 100. The output of the sensor 116 is coupled to the input of the measuring component 106 at the node (N1) 110. As shown, node (N1) 110 is also coupled to a charge amplifier 118 of the measuring component 106. As shown, the charge amplifier 118 includes an integrating capacitor ($C_{int}$) 120 electrically connected across an input 121 and an output 122 of the charge amplifier 118. The charge amplifier 118 is configured to transfer the input charge (e.g., charge from the sensor 102) to the integrating capacitor 120 and to generate an output voltage at least approximately equal to the voltage across the capacitor 120. Thus, the output voltage is proportional to the charge at the integrating capacitor 120 and, respectively, to the input charge. While only a single sensor 116 is shown, the touch panel sensor 102 may include a plurality of sensors 116 in accordance with the requirements of the system 100.

As shown in FIGS. 1B and 1C, the measuring component 106 may be configured in a variety of ways. For example, as shown in FIG. 1B, the measuring component 106 is configured to demodulate signals in the digital domain. In another example, as shown in FIG. 1C, the measuring component 106 is configured to demodulate signals in the analog domain. In an implementation, as shown in FIG. 1B, the measuring component 106 may include an analog-to-digital converter (ADC) 124 coupled to the output of the charge amplifier 118. The ADC 124 is configured to convert an analog signal at the output of the charge amplifier 118 to a corresponding digital quantity representing the analog signal's amplitude. As shown, the ADC 124 is electrically connected to multiple frequency mixers (i.e., frequency mixers 126, 128, 130). The frequency mixers 126, 128, 130 are configured to demodulate the input signals to generate an output signal based upon a corresponding applied signal. In this implementation, the waveform characteristics of the applied signal to the frequency mixer 126 is represented by $\sin(\omega 1 t)$; the waveform characteristics of the applied signal to the frequency mixer 128 is represented by $\sin(\omega 2 t)$; and the waveform characteristics of the applied signal to the frequency mixer 130 is represented by $\sin(\omega 3 t)$. Thus, the applied signals causes each frequency mixer 126, 128, 130 to demodulate the input signal (from the ADC 124) such that the output signal includes waveform characteristics of the applied signal (and excludes the portions of the output signal not including the waveform characteristics of the applied signal). For example, the frequency mixer 126 demodulates the input signal such that the output signal includes waveform characteristics represented by $\sin(w\,it)$; the frequency mixer 128 demodulates the input signal such that the output signal includes waveform characteristics represented by $\sin(\omega 2 t)$; and the frequency mixer 130 demodulates the input signal such that the output signal includes waveform characteristics represented by $\sin(\omega 3 t)$. Thus, each frequency mixer 126, 128, 130 is configured to at least substantially allow transmission of the input signal having waveform characteristics that are the same as the waveform characteristics of the respective applied signal and to prevent transmission of the portions of the input signal having waveform characteristics that differ from the waveform characteristics of the respective applied signal. It is contemplated that in an implementation, $\sin(\omega 1t)$, $\sin(\omega 2t)$ and $\sin(\omega 3t)$ may have a different or the same phase delay.

The frequency mixers 126, 128, 130 are electrically connected to a corresponding integrator 132, 134, 136. The integrators 132, 134, 136 are configured to perform integration (e.g., with respect to time) to the respective signals. Each integrator 132, 134, 136 is electrically connected to an object extraction component 138. The object extraction component 138 is representative of filtering functionality to determine (e.g., identify) positions and/or magnitude of an object (e.g., finger, stylus, etc.) in contact with a touch panel surface based upon one or more changes in the signals at the touch panel sensor 102. For example, the object extraction component 138 may apply a linear average to the values represented by the signals if each of the signals does not include noise (e.g., a substantial amount of noise to corrupt the respective signal). However, if the object extraction component 138 determines a signal is corrupted (e.g., noise having a frequency characteristic at least approximately equal to the frequency characteristic of the corrupted signal is present within the system 100), the object extraction component 138 is configured to disregard (e.g., not account for) the noisy signal. In some implementations, the frequency mixers 126, 128, 130 may not at least substantially allow transmission of the corrupted signal based upon the heterodyning process (e.g., demodulation of the signal).

As shown in FIG. 1C, in another implementation, the output 122 of charge amplifier 118 is directly connected (e.g., electrically) to the respective frequency mixers 126, 128, 130, which are each electrically connected to a corresponding integrator 132, 134, 136. Each of the integrators 132, 134, 136 is electrically connected to a multiplexer component 140. The multiplexer component 140 is configured to select at least one of the input signals (e.g., signals furnished by each integrator 132, 134, 136) and furnish the selected signal to the ADC 124. For instance, the multiplexer component 140 may select the input signal from the integrator 132 such that the input signal is furnished to the ADC 124 for a predetermined time period. Upon the expiration of the predetermined time period, the multiplexer component 140 may select the input signal from the integrator 134 such that the input signal is furnished to the ADC 124 for the predetermined time period, and so on. The ADC 124 is electrically connected to the object extraction component 138, and the object extraction component 138 is configured to determine the positioning and/or magnitude of the object in contact with the touch panel surface.

As shown in FIGS. 1A through 1C, the system 100 further includes a control component 142 (e.g., control logic circuitry) that is configured to control the operation of the system 100. For example, the control component 142 may be electrically connected to touch panel sensor 102, the sensor driver 104, the object extraction component 138, and the multiplexer component 140 (when the implementation shown in FIG. 1C is utilized). For example, the control component 142 may control operation of the sensor driver 104 (e.g., select the frequencies of the respective drive signal), the object extraction component 138, and the multiplexer 140. For example, the object extraction component 138 may communicate when a signal is noisy and which signal is noisy to the control component 142. In response, the control component 142 may cause the sensor driver 104 to change the frequency characteristics of the corrupted (e.g., noisy) signal (e.g., convert the drive signal from a first frequency to a second frequency). The control component 142 may instruct the multiplexer 140 which input signal to select and when to select the input signal (e.g., causes the multiplexer to select a desired input at one or more predetermined times).

The touch panel sensor system 100 is configured to simultaneously measure changes in signals at the touch panel sensor 102 over multiple frequencies. As described above, the touch panel sensor 102 is driven by multiple signals with each drive signal having a differing waveform characteristic (e.g., frequency) as compared to the other drive signals. Thus, if a first drive signal is considered noisy, the second drive signal can still be utilized by the object extraction component 138 to determine the position and/or the magnitude of the object in contact with a touch panel surface. The control component 140 causes the sensor drive 104 to change the noisy drive signal (e.g., causing frequency hopping to another) such that the frequency of the drive signal differs from the frequency occurring when the drive signal is noisy.

Example Methods

Figure 2:
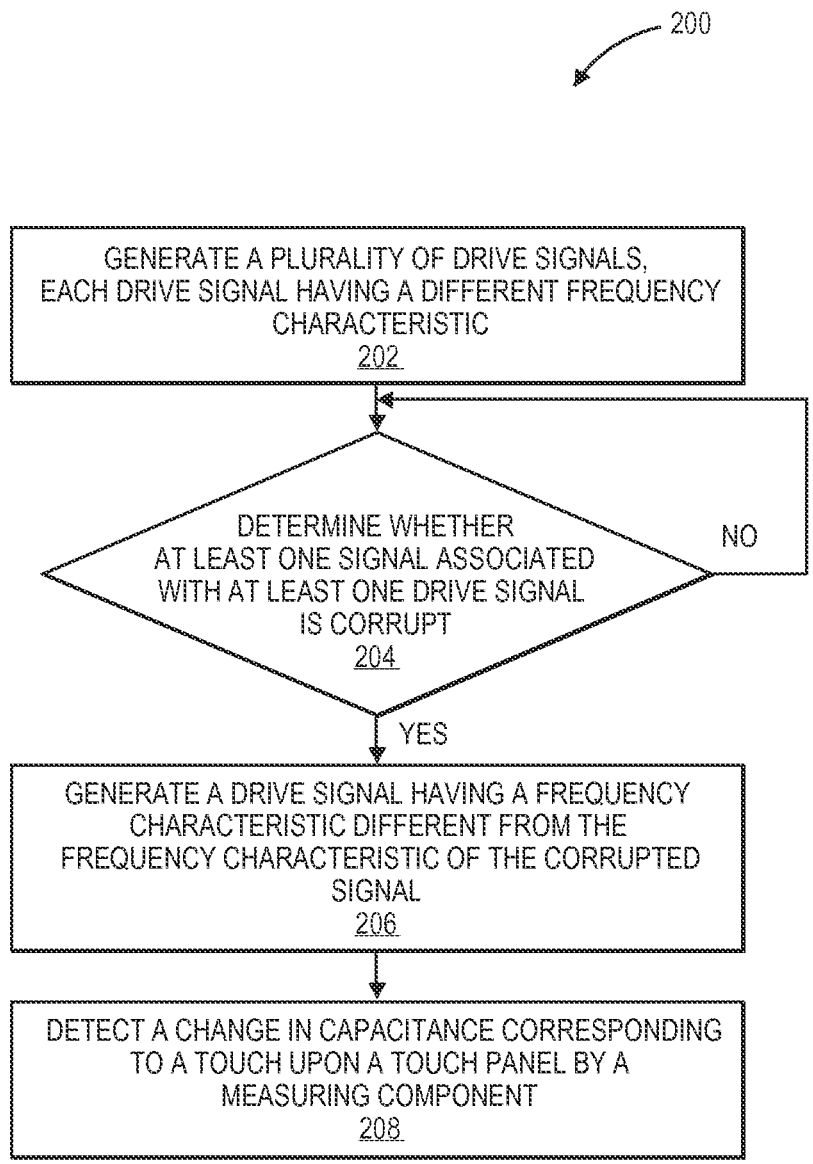
FIG. 2 is a flow diagram illustrating an example method of determining whether a signal is corrupt within the touch panel sensor system according to an example implementation of the present disclosure.
Figure 3:
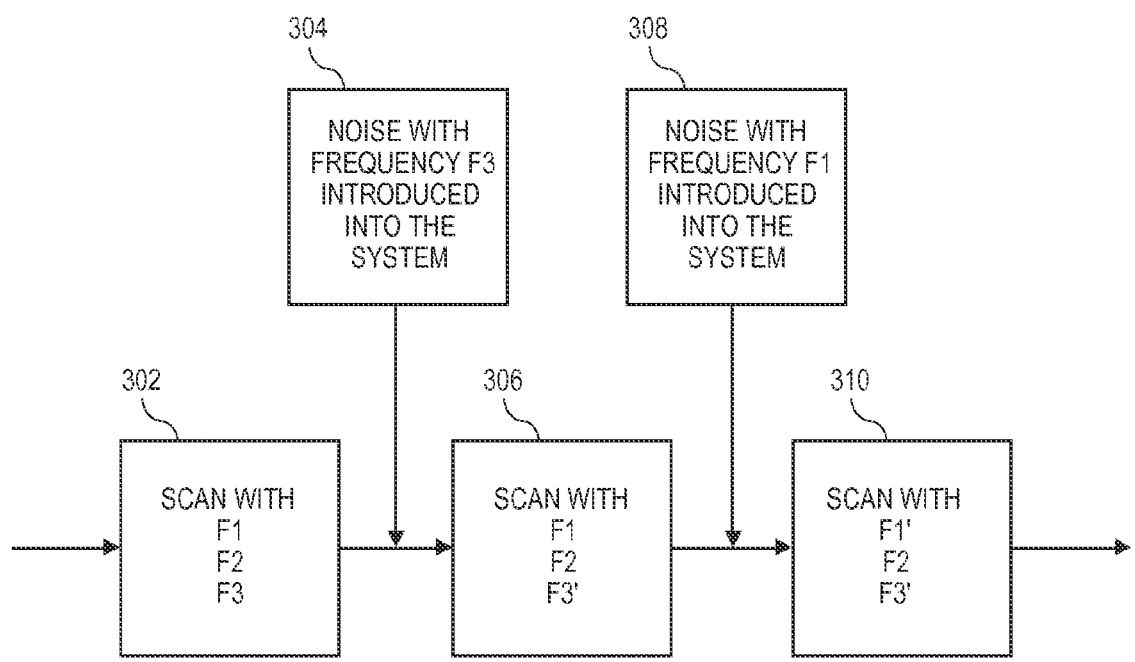
FIG. 3 is a flow diagram illustrating an example method of selectively generating a drive signal having a different frequency characteristic (e.g., frequency) as compared to a frequency characteristic of a corrupted signal according to an example implementation of the present disclosure.

FIG. 2 is a flow diagram illustrating an example method 200 for selectively changing a corrupted drive signal (e.g., noise occurring at a frequency of the drive signal) of the touch panel sensor system 100 in accordance with the present disclosure. A plurality of drive signals is generated to drive a touch panel sensor and each drive signal has a frequency differing from the frequency of the other drive signals (Block 202). In an implementation, the control component 142 is configured to cause (e.g., initiate) the sensor driver 104 to generate a plurality of drive signals (e.g., A1 $\sin(\omega 1t)$, A2 $\sin(\omega 2t)$, A3 $\sin(\omega 3t)$) to simultaneously drive a touch panel sensor 102. For example, as shown in FIG. 3, the touch panel sensor 102 is driven with three (3) signals having frequency F1, frequency F2, and frequency F3, respectively (see Block 302). The object extraction component 138 is configured to continually monitor and determine whether an object comes into contact with a touch panel surface, as well as determining the position and the magnitude of the object when the object comes into contact with the touch panel surface.

As shown in FIG. 2, a determination is made of whether at least one signal of a plurality of signals associated with at least one drive signal of the plurality of drive signals is corrupt, or noisy (Decision Block 204). The system 100 includes a plurality of signals that are associated with, or correspond, to a respective drive signal (e.g., signals having the same, or approximately the same, frequency characteristic as the frequency characteristic of the respective drive signal). For example, a signal having a first frequency characteristic corresponds to a drive signal having the first frequency characteristic. In this example, the signal having the first characteristic may represent the signal present at the measuring component 106 for which the measuring component 106 determines if the signal is corrupted or utilize the signal to determine whether a change in capacitance has occurred due to a touch event over the touch panel. If the signal is corrupt (YES from Decision Block 204), a drive signal having a frequency different than the corrupted frequency is generated (Block 206). For example, noise occurring at frequency F3 may be present within the system 100. This noise may corrupt the signal occurring at frequency F3, which may cause inaccurate measurements (e.g., determinations) related to an object that is in contact with the touch panel surface. Thus, the object extraction component 138 continually determines (e.g., scans, detects, etc.) whether one or more of the signals is corrupted. For example, the component 138 may determine no signal is present due to a frequency mixer at least substantially preventing the transmission of a signal occurring at frequency F3.

If a signal is not corrupted, the control component 142 is configured to continually monitor whether one or more of the signals are corrupted (NO from Decision Block 204). As described above, the control component 142 is in communication with the object extraction component 138 to determine whether one or more signals are corrupt. As shown in FIG. 3, noise occurring at frequency F3 is introduced into (e.g., present in) the system 100. Upon notification that the signal corresponding to the respective drive signal having frequency F3 is corrupt (Block 304), the control component 142 is configured to cause the sensor driver 104 to generate a drive signal having a frequency F3' (Block 306).

As shown in FIG. 3, noise occurring at frequency F1 may be introduced to the system 100 (Block 308). As described with respect to Blocks 204 and 206, a determination is made whether at least one signal associated with the drive signals is corrupt. If a signal is determined to be corrupted, the control component 138 causes the sensor driver 104 to generate a drive signal having a different frequency as compared to the corrupted frequency (e.g., drive signal having frequency F1' in Block 310). Thus, FIG. 3 illustrates that an at least approximately zero latency frequency hopping technique may be incorporated into the system 100 (e.g., having the ability to change frequencies of one or more drive signals and maintaining an at least approximately zero latency when detecting a change in capacitance over the touch panel). As shown in FIG. 2, a measuring component detects a change in capacitance corresponding to a touch upon a touch panel (Block 208). As described above, the measuring component 106 is configured to determine whether a touch was performed over the surface of the touch panel. For example, once each signal that corresponds to a respective drive signal is individually demodulated, the measuring component 106 determines whether a change in capacitance has occurred by determining whether any changes are detected within one or more of the demodulated signals (e.g., the object extraction component 138 may detect one or more changes in each demodulated signal that correspond to the same touch event, etc.).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
a sensor configured to detect a change in capacitance associated with a touch upon a touch panel;
a drive component communicatively coupled to the sensor, the drive component configured to simultaneously generate a plurality of drive signals to drive the sensor, each drive signal of the plurality of drive signals having a different frequency characteristic with respect to the other drive signals of the plurality of drive signals;
a measuring component communicatively coupled to the sensor, the measuring component configured to individually demodulate the plurality of drive signals to determine the change in capacitance;
an object extraction component communicatively coupled to the measuring component, the object extraction component configured to determine a position of the touch over the touch panel based upon the change in capacitance, the object extraction component configured to cause a control component to cause the drive component to generate another drive signal having a different frequency characteristic with respect to the other drive signals of the plurality of drive signals when a drive signal corresponding to a corrupted drive signal is detected by the object extraction component.

2. The system as recited in claim 1, wherein the measuring component comprises a charge amplifier, an analog-to-digital converter coupled to the charge amplifier, a plurality of frequency mixers coupled to the analog-to-digital converter, wherein the object extraction component is communicatively coupled to each frequency mixer of the plurality of frequency mixers.

3. The system as recited in claim 2, wherein each frequency mixer of the plurality of frequency mixers is configured to at least substantially allow transmission of a signal when a frequency characteristic of the signal at least substantially equals a frequency characteristic of an applied signal and to prevent transmission of the signal when the frequency characteristic of the signal does at least substantially equal the frequency characteristic of the applied signal, wherein the signal is based upon at least one of the plurality of drive signals and the applied signal is applied to a respective frequency mixer of the plurality of frequency mixers.

4. The system as recited in claim 2, wherein the measuring component further comprises a plurality of integrators, each integrator of the plurality of integrators coupled to a corresponding frequency mixer of the plurality of frequency mixers.

5. The system as recited in claim 1, further comprising the control component communicatively coupled to the drive component and to the object extraction component, the control component configured to cause the drive component to generate the plurality of drive signals, wherein the control component is configured to cause the drive component to generate another drive signal having a different frequency characteristic with respect to the other drive signals of the plurality of drive signals when the object extraction component issues a signal to the control component indicating that a corrupted drive signal is detected by the object extraction component.

6. The system as recited in claim 1, wherein the measuring component comprises a charge amplifier, a plurality of frequency mixers coupled to the charge amplifier, a plurality of integrators each coupled to a corresponding frequency mixer of the plurality of frequency mixers, a multiplexer component coupled to the plurality of integrators, and an analog-to-digital converter coupled to the multiplexer component, wherein the object extraction component is coupled to the analog-to-digital converter, and wherein the object extraction component is configured to determine a position of the touch over the touch panel based upon the change in capacitance.

7. The system as recited in claim 1, wherein the drive component is configured to generate a first drive signal having a first frequency characteristic, a second drive signal having a second frequency characteristic, and a third drive signal having a third frequency characteristic.

8. The system as recited in claim 7, wherein the drive component is configured to generate a fourth drive signal having a fourth frequency characteristic when at least one of the first drive signal, the second drive signal, or the third drive signal is corrupted.

9. A system comprising:
a sensor configured to detect a change in capacitance associated with a touch upon a touch panel;
a drive component communicatively coupled to the sensor, the drive component configured to simultaneously generate a plurality of drive signals to drive the sensor, each drive signal of the plurality of drive signals having a different frequency characteristic with respect to the other drive signals of the plurality of drive signals;

a plurality of frequency mixers communicatively coupled to the sensor, each frequency mixer of the plurality of mixers configured to individually demodulate each drive signal of plurality of drive signals; and an object extraction component communicatively coupled to the plurality of frequency mixers, the object extraction component configured to measure a change of capacitance utilizing at least one of the individually demodulated signals to measure the change in capacitance to determine a position of the touch over the touch panel, the object extraction component configured to cause a control component to cause the drive component to generate another drive signal having a different frequency characteristic with respect to the other drive signals of the plurality of drive signals when a drive signal corresponding to a corrupted drive signal is detected by the object extraction component.

10. The system as recited in claim 9, wherein each frequency mixer of the plurality of frequency mixers is configured to at least substantially allow transmission of a signal when a frequency characteristic of the signal at least substantially equals a frequency characteristic of an applied signal and to prevent transmission of the signal when the frequency characteristic of the signal does at least substantially equal the frequency characteristic of the applied signal, wherein the signal is based upon at least one of the plurality of drive signals and the applied signal is applied to a respective frequency mixer of the plurality of frequency mixers.

11. The system as recited in claim 9, further comprising the control component communicatively coupled to the drive component and to the object extraction component, the control component configured to cause the drive component to generate the plurality of drive signals, wherein the control component is configured to cause the drive component to generate another drive signal having a different frequency characteristic with respect to the other drive signals of the plurality of drive signals when the object extraction component issues a signal to the control component indicating that a corrupted drive signal is detected by the object extraction component.

12. The system as recited in claim 9, wherein the drive component is configured to generate a first drive signal having a first frequency characteristic, a second drive signal having a second frequency characteristic, and a third drive signal having a third frequency characteristic.

13. The system as recited in claim 12, wherein the drive component is configured to generate a fourth drive signal having a fourth frequency characteristic when at least one of the first drive signal, the second drive signal, or the third drive signal is corrupted.

14. The system as recited in claim 9, wherein the drive component comprises a digital-to-analog converter coupled to a buffer.

15. A method comprising:

initiating generation of a plurality of drive signals at a drive component to simultaneously drive a sensor configured to detect a change in capacitance corresponding to a touch upon a touch panel, each drive signal of the plurality of drive signals having a different frequency characteristic;

determining whether at least one drive signal of the plurality of drive signals is corrupt at an object extraction component, the object extraction component configured to determine a position of the touch over the touch panel based upon the change in capacitance; and initiating generation of another drive signal having a frequency characteristic different from a frequency characteristic of the at least one drive signal when the object extraction component determines the at least one drive signal is corrupt.

16. The method as recited in claim 15, further comprising detecting the change in capacitance corresponding to the touch upon the touch panel at a measuring component, the measuring component communicatively coupled to the object extraction component.

17. The method as recited in claim 16, wherein the measuring component comprises a plurality of frequency mixers, each frequency mixer of the plurality of frequency mixers configured to demodulate a respective signal of the plurality of signals based upon an applied signal at a respective frequency mixer of the plurality of frequency mixers.

18. The method of claim 16, wherein the measuring component further comprises a charge amplifier disposed between the sensor and the plurality of frequency mixers.

19. The method of claim 15, wherein the driving component comprises a digital-to-analog converter coupled to a buffer.

\* \* \* \* \*

UNITED STATES PATENT AND TRADEMARK OFFICE
CERTIFICATE OF CORRECTION

PATENT NO. : 9,256,329 B1
APPLICATION NO. : 13/719656
DATED : February 9, 2016
INVENTOR(S) : Guozhong Shen et al.

It is certified that error appears in the above-identified patent and that said Letters Patent is hereby corrected as shown below:

In the Claims

At Column 8, Line 18, in claim 3, please replace the phrase "does at least substantially equal" with "does not substantially equal".

At Column 9, Line 26, in claim 10, please replace the phrase "does at least substantially equal" with "does not substantially equal".

Signed and Sealed this
Third Day of May, 2016

Michelle K. Lee
*Director of the United States Patent and Trademark Office*